US009288034B2

(12) United States Patent
Lim et al.

(10) Patent No.: US 9,288,034 B2
(45) Date of Patent: Mar. 15, 2016

(54) METHOD OF TRANSMITTING AND RECEIVING CONTROL INFORMATION IN A WIRELESS COMMUNICATION SYSTEM

(75) Inventors: Dong Guk Lim, Anyang-si (KR); Han Gyu Cho, Anyang-si (KR); Sung Ho Moon, Anyang-si (KR); Jin Sam Kwak, Gyeonggi-do (KR)

(73) Assignee: LG ELECTRONICS INC., Seoul (KR)

( * ) Notice: Subject to any disclaimer, the term of this patent is extended or adjusted under 35 U.S.C. 154(b) by 551 days.

(21) Appl. No.: 12/868,443

(22) Filed: Aug. 25, 2010

(65) Prior Publication Data

US 2011/0051634 A1 Mar. 3, 2011

Related U.S. Application Data

(60) Provisional application No. 61/236,546, filed on Aug. 25, 2009, provisional application No. 61/237,298, filed on Aug. 27, 2009, provisional application No. 61/237,305, filed on Aug. 27, 2009.

(30) Foreign Application Priority Data

Apr. 6, 2010 (KR) .................. 10-2010-0031302

(51) Int. Cl.
*H04L 5/16* (2006.01)
*H04L 5/00* (2006.01)
(52) U.S. Cl.
CPC ............... *H04L 5/16* (2013.01); *H04L 5/0023* (2013.01)
(58) Field of Classification Search
CPC .................................................. H04L 5/0053
USPC ............................................. 375/260
See application file for complete search history.

(56) References Cited

U.S. PATENT DOCUMENTS 7,899,084 B2 3/2011 Cho et al.
8,605,569 B2 12/2013 Olszewski et al.
(Continued)

FOREIGN PATENT DOCUMENTS

| CN | 101019398 A | 8/2007 |
|---|---|---|
| WO | WO 2009/091931 A1 | 7/2009 |
| WO | WO 2009/102182 A1 | 8/2009 |

OTHER PUBLICATIONS 802.16m-09/0010r2 Part 16: Air Interface for Fixed and Mobile Broadband Wireless Access Systems; Advanced Air Interface (working document); Jun. 1, 2009.* P802.16Rev2/D9a Mar. 2009, Draft Standard for Local and Metropolitan area networks, Part 16 Air Interface for Broadband Wireless Access Systems.*

(Continued)

*Primary Examiner* — Joseph Bednash
(74) *Attorney, Agent, or Firm* — Birch, Stewart, Kolasch & Birch, LLP (57) ABSTRACT

A method for transmitting and receiving control information in a wireless communication system is disclosed. A method for transmitting control information in procedure of data transmission and reception with FDD (frequency division duplex) scheme by a base station of a wireless communication system supporting a mobile station of a first system and a mobile station of a second system includes transmitting information about a number of orthogonal frequency division multiplexing (OFDM) symbols contained in a downlink zone of a frame of the first system in downlink bandwidth to a mobile station of the first system through a 'Number of OFDMA symbols' field of a downlink MAP (DL-MAP); and transmitting information about a number of OFDM symbols contained in an uplink zone of the frame of the first system in uplink bandwidth to the mobile station of the first system through a 'Number of OFDMA symbols' field of an uplink MAP (UL-MAP), wherein the mobile station operates with half-FDD (H-FDD), and the downlink zone of the frame of the first system does not overlap with the uplink zone of the frame of the first system in time domain.

16 Claims, 5 Drawing Sheets

(56) References Cited

U.S. PATENT DOCUMENTS

| | | | |
|---|---|---|---|
| 2008/0089309 A1* | 4/2008 | Groleau et al. | 370/342 |
| 2008/0152029 A1 | 6/2008 | Kwon et al. | |
| 2008/0285668 A1 | 11/2008 | Lee et al. | |
| 2009/0022178 A1 | 1/2009 | Ji et al. | |
| 2009/0185632 A1* | 7/2009 | Cai et al. | 375/260 |
| 2009/0296609 A1* | 12/2009 | Choi et al. | 370/281 |
| 2011/0026627 A1* | 2/2011 | Chun et al. | 375/260 |
| 2014/0112274 A1 | 4/2014 | Moon et al. | |

OTHER PUBLICATIONS

IEEE C802.16m-09/1198, "Proposed Changes/Refinements to the Sections 11.3 and 11.4 of IEEE802.16mSDD", Jul. 3, 2009.*

Cho et al., "Frame Structure and Operation for H-FDD AMS (15.3.3)", IEEE 802.16 Broadband Wireless Access Working Group. Aug. 30, 2009, 5 pgs.*

Lim et al., "Clarifications on H-FDD Operation for AMS and WirelessMAN-OFDMA H-FDD MS (15.3.3.2.1 and 15.3.3.8)", IEEE 802.16 Broadband Wireless Access Working Group, Nov. 6, 2009, 6 pgs.*

* cited by examiner

METHOD OF TRANSMITTING AND RECEIVING CONTROL INFORMATION IN A WIRELESS COMMUNICATION SYSTEM

CROSS-REFERENCE TO RELATED APPLICATIONS

This application claims the benefit of the Korean Patent Application No. 10-2010-0031302, filed on Apr. 6, 2010, which are hereby incorporated by reference as if fully set forth herein.

This application also claims the benefit of U.S. Provisional Application Ser. Nos. 61/236,546, filed on Aug. 25, 2009, 61/237,298, filed on Aug. 27, 2009, and 61/237,305, filed on Aug. 27, 2009, the content of which is hereby incorporated by reference herein in their entirety.

FIELD OF THE INVENTION

The present invention relates to a wireless communication system, and more particularly to a method for transmitting control information in a wireless communication system.

DISCUSSION OF THE RELATED ART

A brief description will be given below of a frame structure for use in an Institute of Electrical and Electronics Engineers (IEEE) 802.16m system.

Figure 1:
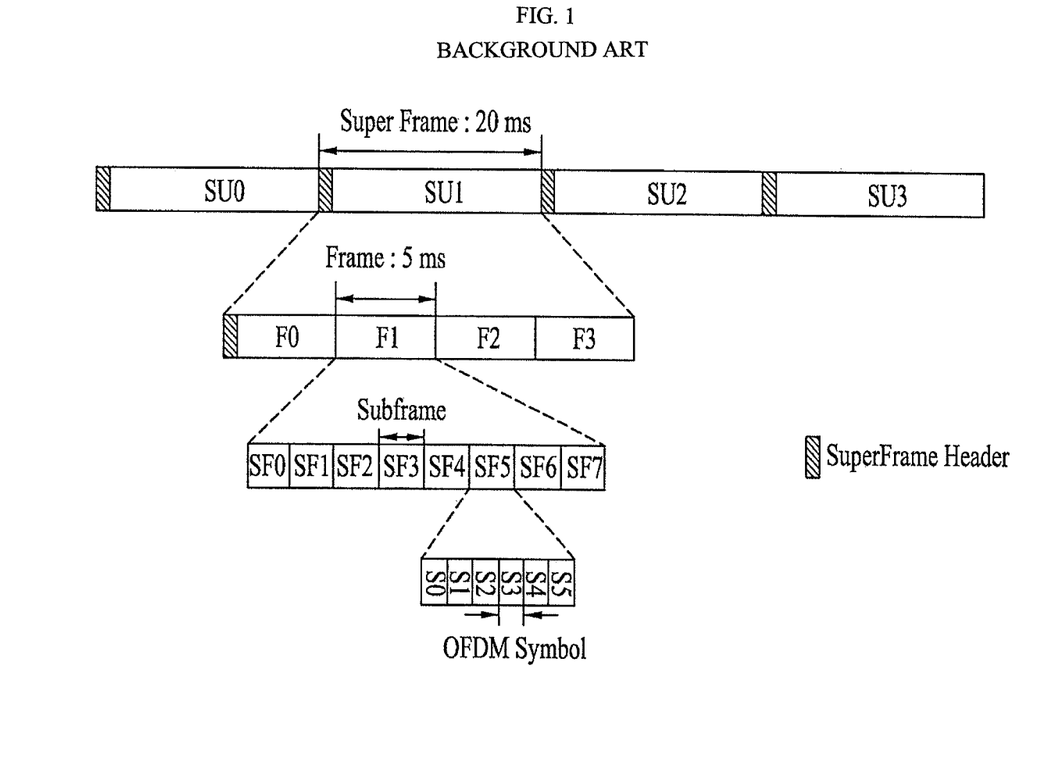
FIG. 1 is a structural diagram illustrating a frame structure for use in an IEEE 802.16m system.

FIG. 1 is a structural diagram illustrating a frame structure for use in an IEEE 802.16m system.

Referring to FIG. 1, each 20 ms superframe is divided into four 5 ms frames and begins with a superframe header (SFH). If a channel bandwidth of 5 MHz, 10 MHz, or 20 MHz is given, each 5 ms frame may be further divided into 8 subframes. In addition, if a channel bandwidth of 7 MHz is given, each 5 ms frame includes 5 subframes. If a channel bandwidth of 8.75 MHz is given, each 5 ms frame includes 7 subframes. One subframe may be allocated for downlink (DL) or uplink (UL) transmission.

There are three types of subframes in the IEEE 802.16m system: a first type (Type 1) subframe consisting of 6 OFDMA symbols; a second type (Type 2) subframe consisting of 6 OFDMA symbols; and a third type (Type 3) subframe consisting of 5 OFDMA symbols.

The frame structure shown in FIG. 1 may be applied not only to a Half-Frequency Division Duplex (H-FDD) mobile station (MS) operation but also to time division duplexing (TDD) and frequency division duplexing (FDD) schemes. A frame for use in the TDD scheme includes two switching points, i.e., a first switching point from downlink (DL) to uplink (UL) and a second switching point from uplink (UL) to downlink (DL).

The H-FDD MS may be contained in an FDD system. From the viewpoint of the H-FDD MS, although a frame structure is similar to a TDD frame structure, downlink and uplink transmission occur in two individual frequency bands.

In accordance with the conventional art, only a specific frame supporting only an IEEE 802.16m MS is present in the IEEE 802.16m system. However, an IEEE 802.16e MS is co-located with an IEEE 802.16m MS, such that it is necessary for the IEEE 802.16m system to include a frame structure supporting both the IEEE 802.16e MS and the IEEE 802.16m MS.

SUMMARY OF THE INVENTION

As described above, the IEEE 802.16m system according to the conventional art does not include the frame structure supporting both the IEEE 802.16e MS and the IEEE 802.16m MS, such that it is necessary for an IEEE 802.16m system according to the present invention to use the frame structure supporting both the IEEE 802.16e MS and the IEEE 802.16m MS.

In addition, a base station must transmit information about a frame structure supporting both the IEEE 802.16e MS and the IEEE 802.16m MS to each of the IEEE 802.16e MS and the IEEE 802.16m MS.

Accordingly, the present invention is directed to a method for transmitting and receiving control information in a wireless communication system that substantially obviates one or more problems due to limitations and disadvantages of the related art.

An object of the present invention devised to solve the problem lies on a frame structure supporting both the IEEE 802.16e MS and the IEEE 802.16m MS, and a method for transmitting control information about the proposed frame structure to a mobile station (MS).

It will be appreciated by persons skilled in the art that the objects that can be achieved with the present invention are not limited to what has been particularly described hereinabove and the above and other objects that the present invention can achieve will be more clearly understood from the following detailed description taken in conjunction with the accompanying drawings.

The object of the present invention can be achieved by providing a method for transmitting control information in procedure of data transmission and reception with FDD (frequency division duplex) scheme by a base station of a wireless communication system supporting a mobile station of a first system and a mobile station of a second system, the method including transmitting information about a number of orthogonal frequency division multiplexing (OFDM) symbols contained in a downlink zone of a frame of the first system in downlink bandwidth to a mobile station of the first system through a 'Number of OFDMA symbols' field of a downlink mobile application part (DL-MAP); and transmitting information about a number of OFDM symbols contained in an uplink zone of the frame of the first system in uplink bandwidth to the mobile station of the first system through a 'Number of OFDMA symbols' field of an uplink MAP (UL-MAP), wherein the mobile station operates with half-FDD (H-FDD), and the downlink zone of the frame of the first system does not overlap with the uplink zone of the frame of the first system in time domain.

In another aspect of the present invention, provided herein is a method for receiving control information in procedure of data transmission and reception with FDD (frequency division duplex) scheme by a mobile station operating with half-FDD (H-FDD) of a wireless communication system supporting a mobile station of a first system and a mobile station of a second system, the method including: receiving information about a number of orthogonal frequency division multiplexing (OFDM) symbols contained in a downlink zone of a frame of the first system in downlink bandwidth from a base station through a 'Number of OFDMA symbols' field of a downlink MAP (DL-MAP); and receiving information about a number of OFDM symbols contained in an uplink zone of the frame of the first system in uplink bandwidth from the base station through a 'Number of OFDMA symbols' field of an uplink MAP (UL-MAP), wherein the downlink zone of the frame of the first system does not overlap with the uplink zone of the frame of the first system in time domain.

In another aspect of the present invention, provided herein is a base station in a wireless communication system supporting a mobile station of a first system and a mobile station of a second system, the base station including a processor for deciding a number of orthogonal frequency division multiplexing (OFDM) symbols contained in a downlink zone of a frame of the first system in downlink bandwidth and a number of OFDM symbols contained in an uplink zone of the frame of the first system in uplink bandwidth; and a transmission (Tx) module for transmitting, to a mobile station of the first system operating with half-FDD (H-FDD), information about the number of OFDM symbols contained in the downlink zone and information about the number of OFDM symbols contained in the uplink zone through a 'Number of OFDMA symbols' field of a downlink MAP (DL-MAP) and a 'Number of OFDMA symbols' field of an uplink MAP (UL-MAP) respectively, wherein the mobile station and the base station transmit and receive data with FDD (frequency division duplex) scheme and the downlink zone of the frame of the first system does not overlap with the uplink zone of the frame of the first system in time domain.

In another aspect of the present invention, provided herein is a mobile station operating with half-FDD (H-FDD) in a wireless communication system supporting a mobile station of a first system and a mobile station of a second system, the mobile station including a reception (Rx) module for receiving, from a base station, information about a number of orthogonal frequency division multiplexing (OFDM) symbols contained in a downlink zone of a frame of the first system in downlink bandwidth and information about a number of OFDM symbols contained in an uplink zone of the frame of the first system in uplink bandwidth through a 'Number of OFDMA symbols' field of a downlink MAP (DL-MAP) and an uplink MAP (UL-MAP) respectively; and a processor for performing switching from downlink (DL) to uplink (UL) after a lapse of as many OFDM symbols as the number of OFDM symbols contained in the downlink zone from a start point of the frame of the first system, wherein the downlink zone of the frame of the first system does not overlap with the uplink zone of the frame of the first system in time domain.

Preferably, a downlink zone of the second system is allocated after the downlink zone of the first system in downlink bandwidth and an uplink zone of the second system is allocated before the uplink zone of the first system in uplink bandwidth.

More preferably, sum of the downlink zone of the first system and the downlink zone of the second system is length of a frame of the second system.

More preferably, sum of the uplink zone of the first system and the uplink zone of the second system is length of a frame of the second system.

More preferably, a ratio of a number of subframes of the first system and a number of subframes of the second system contained in the frame of the second system is one of 2:6, 3:5 and 4:4.

More preferably, the downlink zone of the second system overlaps with the uplink zone of the second system in the time domain.

It will be appreciated by persons skilled in the art that the objects that can be achieved through practice of the present invention are not limited to what has been particularly described hereinabove and the above and other objects that can be achieved through practice of the present invention will be more clearly understood from the following detailed description taken in conjunction with the accompanying drawings

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF EMBODIMENTS

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering upon a mobile communication system serving as a 3rd Generation Partnership Project 2 (3GPP2) 802.16 system, but the present invention is not limited thereto and the remaining parts of the present invention other than unique characteristics of the 3GPP2 802.16 system are applicable to other mobile communication systems.

In some cases, in order to prevent ambiguity of the concepts of the present invention, conventional devices or apparatuses well known to those skilled in the art will be omitted and denoted in the form of a block diagram on the basis of the important functions of the present invention. Wherever possible, the same reference numbers will be used throughout the drawings to refer to the same or like parts.

In the following description, "terminal" may refer to a mobile or fixed user equipment (UE), for example, a user equipment (UE), a mobile station (MS) and the like. Also, "base station" (BS) may refer to an arbitrary node of a network end which communicates with the above terminal, and may include a Node B (Node-B), an eNode B (eNode-B) and the like.

First, a frame structure supporting both a first system MS and a second system MS according to embodiments of the present invention will hereinafter be described with reference to the accompanying drawings. For example, the first system may serve as the IEEE 802.16m system and the second system may serve as the IEEE 802.16e system. Although the embodiments of the present invention are described using the IEEE 802.16m system and the IEEE 802.16e system as examples, the scope or spirit of the present invention is not limited only thereto and can be applied to other examples as necessary.

Figure 2:
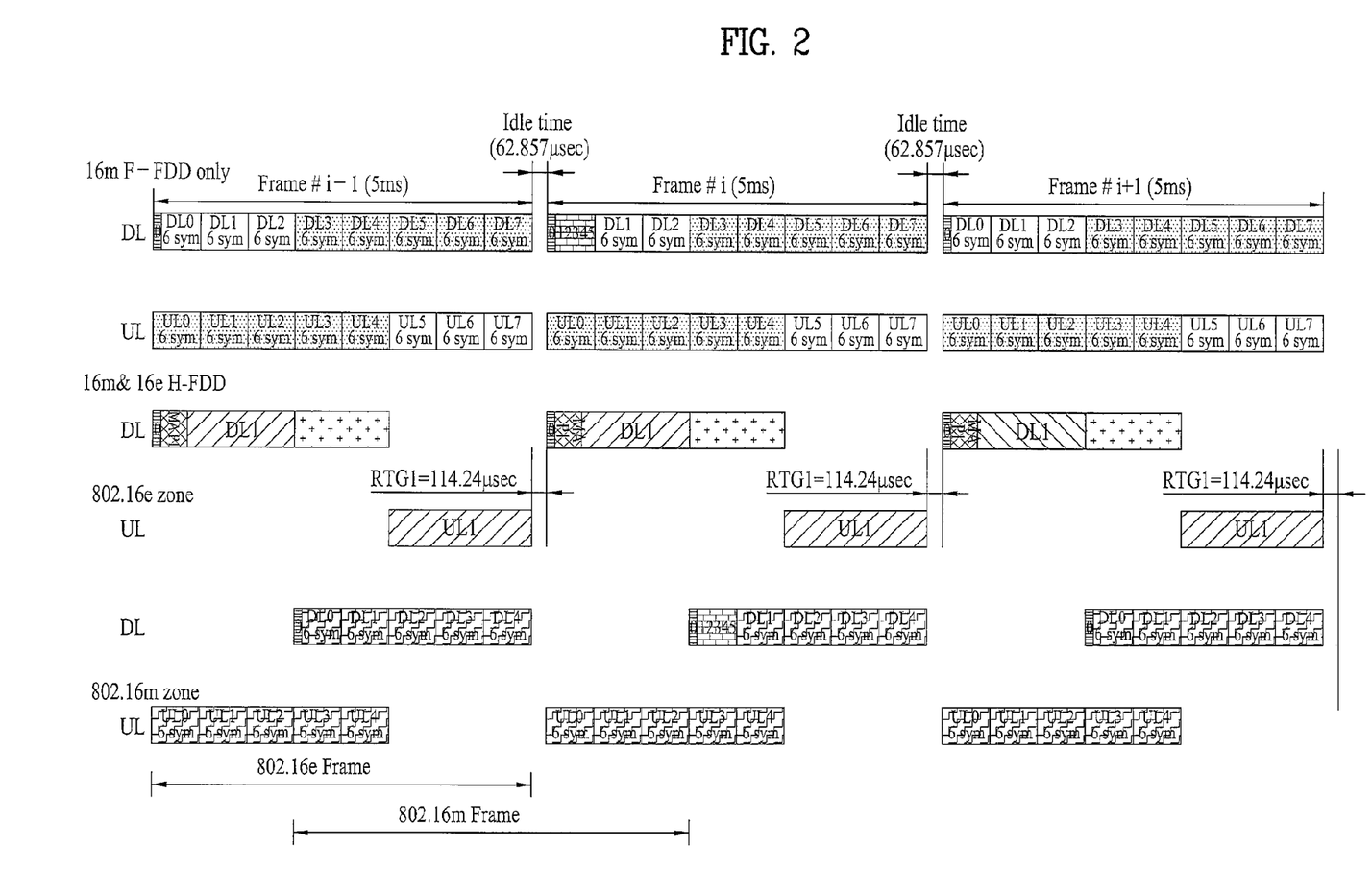
FIG. 2 shows a frame structure supporting only an MS of a first system and a frame structure supporting only an MS of a second system according to exemplary embodiments of the present invention.

FIG. 2 shows a frame structure for supporting only an MS of a first system and a frame structure for supporting only an MS of a second system according to exemplary embodiments of the present invention.

Referring to FIG. 2, in a frame supporting only the IEEE 802.16m FDD MS, uplink (DL) and downlink (UL) zones are allocated to different frequency bands, and the frame includes 8 subframes. An F-FDD MS can simultaneously transmit and receive data, such that a downlink (DL) zone and an uplink (UL) zone may overlap with each other.

Referring to FIG. 2, a frame supporting both the IEEE 802.16m FDD MS and the IEEE 802.16e H-FDD MS may include one zone capable of being allocated to support the IEEE 802.16m FDD MS and another area capable of being allocated to support the IEEE 802.16e H-FDD MS. In this case, an area capable of being allocated for the IEEE 802.16m FDD MS is called an 802.16m zone, and an area capable of being allocated for the IEEE 802.16e FDD MS is called an 802.16e zone. The 802.16m zone includes an 802.16m UL zone and an 802.16m DL zone. The 802.16e zone includes an 802.16e UL zone and an 802.16e DL zone. In relation to zone configuration information that is allocated to support the IEEE 802.16e MS within a frame, a base station transmits the zone configuration information as a broadcast-, multicast- or unicast-signal to each of F-FDD and H-FDD MSs, and the MS can recognize the start and ending points of an allocated zone using the received information. Likewise, assuming that one frame supports all the above-mentioned systems, some or all of the 802.16e DL zone may be used for transmission and reception of data according to the number of 802.16e FDD or H-FDD MSs, transmission traffic and the like. That is, the DL zone allocated for the IEEE 802.16e FDD MS may be variably used according to conditions of a supported MS. A zone not used for the aforementioned MS from among the allocated zones is allocated to the 802.16m MS, such that resources can be effectively used by the 802.16m MS.

In addition, a DL zone that is actually allocated to the IEEE 802.16m FDD MS within the 802.16m DL zone is called an 802.16m DL zone, and a UL zone that is actually allocated to the IEEE 802.16m FDD MS within the 802.16m DL zone is called an 802.16m UL zone. In addition, a DL zone that is actually allocated to the IEEE 802.16e FDD MS within the 802.16e DL zone is called an 802.16e DL zone, and a UL zone that is actually allocated to the IEEE 802.16e FDD MS within the 802.16e DL zone is called an 802.16e UL zone. A DL zone and the aforementioned DL zone actually allocated to the MS may have the same or different sizes, and a UL zone and the aforementioned UL zone actually allocated to the MS may have the same or different sizes. In this case, the zone not used in the IEEE 802.16e zone may be allocated to and used by the IEEE 802.16m MS.

Figure 3:
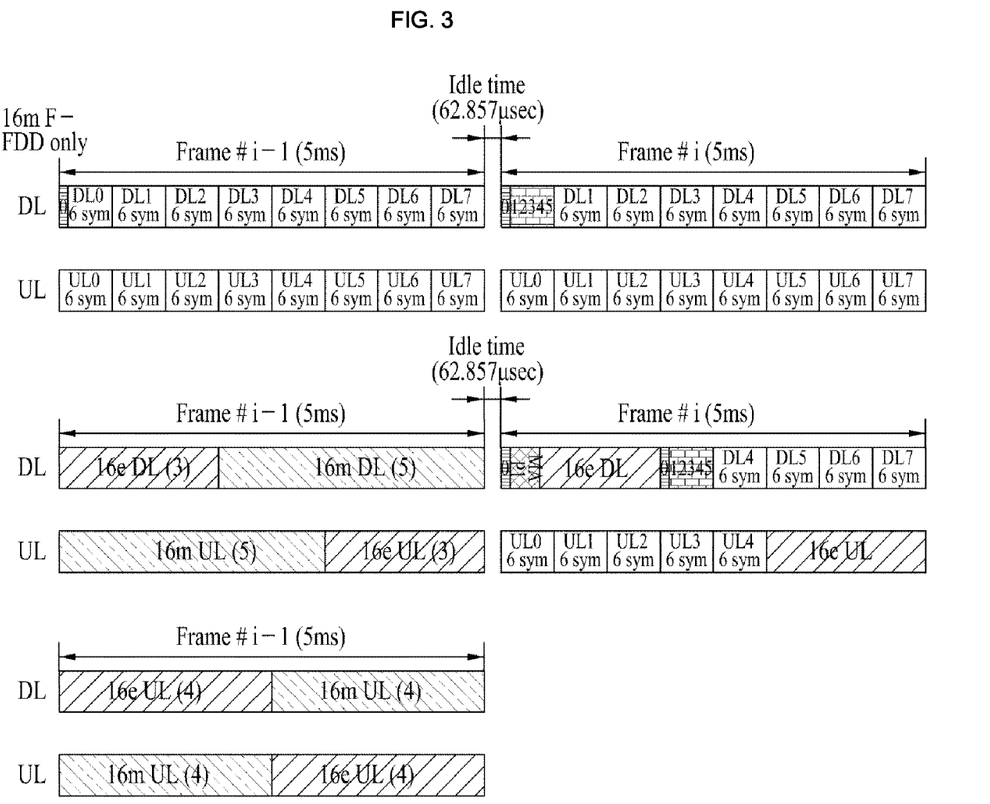
FIG. 3 shows frame structures used when the ratios of the number of subframes allocated to the IEEE 802.16m MS to the number of subframes allocated to the IEEE 802.16e MS are 5:3 and 4:4 according to exemplary embodiments of the present invention.

Therefore, a base station (BS) may allocate a zone smaller than the 802.16e DL zone to the 802.16e MS in consideration of MS load balancing, traffic, the number of MSs contained in a cell, etc. within the 802.16e DL zone. In this case, signal reception of the 802.16e MS must occur only in the allocated DL zone. For example, assuming that the ratio of the number of 802.16e DL zones to the number of 802.16m DL zones is 5:3 as shown in FIG. 3, the switching from DL to UL occurs at a fifth subframe, the 802.16e DL zone includes 5 subframes from a first subframe (DL 0) to a fifth subframe (DL 4), but the BS may also perform the scheduling of the 802.16e MS using only the 802.16e DL zones (DL 0, DL 1 and DL 2). If necessary, the BS may further allocate zones (DL3 and DL4) that are unallocated to the 802.16e MS within the 802.16e DL zone, to the 802.16m MS (FDD or H-FDD MS).

Considering that the 802.16e DL zone is unable to overlap with the 802.16e UL zone, a maximum size of each of the 802.16e DL zone and the 802.16e UL zone is 2 subframes at 7 MHz, 3 subframes at 8.75 MHz, and 4 subframes at any of 5 MHz, 10 MHz or 20 MHz. Therefore, the frame configuration may be represented by the following Table 1.

TABLE 1

| Bandwidth | Number of subframes per frame | Number of subframes allocated to 802.16m MS:Number of subframes allocated to 802.16e MS |
|---|---|---|
| 5 MHZ | 8 | (6, 2), (5, 3), (4, 4) |
| 10 MHZ | | |
| 20 MHZ | | |
| 7 MHZ | 5 | (3, 2) |
| 8.75 MHz | 7 | (5, 2), (4, 3) |

FIG. 3 shows frame structures used when the ratios of the number of subframes allocated to the IEEE 802.16m MS to the number of subframes allocated to the IEEE 802.16e MS are 5:3 and 4:4 according to exemplary embodiments of the present invention.

Referring to FIG. 3, within the 802.16e frame structure, a UL zone is located ahead of a DL zone in the 802.16m zone, and a DL zone is located ahead of a UL zone in the 802.16e zone. In addition, the UL zone and the DL zone may overlap each other in the 802.16m zone. The H-FDD MS is unable to simultaneously transmit and receive data, such that it is impossible for the UL zone and the DL zone to overlap with each other in the 802.16e zone.

In downlink, a DL zone of the 802.16e system and a DL zone of the 802.16m system are time division multiplexed. In uplink, a UL zone of the 802.16m system and a UL zone of the 802.16m system are time division multiplexed. In downlink, the DL zone of the 802.16e system comes first. In uplink, the DL zone of the 802.16m system comes first.

In addition, a distinction between the DL zone of the 802.16e system and the DL zone of the 802.16m system and a distinction between the UL zone of the 802.16e system and the UL zone of the 802.16m system are carried out on a subframe basis. In other words, each of the DL zone of the 802.16e system, the DL zone of the 802.16m system, the UL zone of the 802.16e system, and the UL zone of the 802.16m system includes an integer number of subframes. The reason why each DL or UL zone includes an integer number of subframes is to prevent operations of the 802.16m MS from being affected by the IEEE 802.16m system supporting the 802.16e MS. Therefore, the 802.16e zone includes a predetermined number of subframes, wherein the predetermined number of subframes may be equal to or greater than a minimum number of symbols requisite for the IEEE 802.16e system.

If it is assumed that the number of subframes present in one frame is set to F, it is impossible for the DL zone to overlap with the UL zone within the 802.16e zone, such that the DL zone of the 802.16m system includes ceil(F/2) or more subframes.

Although the number of subframes contained in the UL zone of the 802.16m system may vary, it is preferable that the number of subframes of the UL zone of the 802.16m system be identical to that of the DL zone of the 802.16m system so as to achieve convenience in FDD. Therefore, the sum of the number of subframes contained in the UL zone of the 802.16m system and the number of subframes contained in the DL zone of the 802.16m system must be F or more.

A Transmit Transition Gap (TTG) for the switching from DL to UL may be contained in the 802.16e DL zone or the 802.16e UL zone. In addition, not all parts between the 802.16e DL zone and the 802.16e UL zone are TTGs. The base station (BS) may decide the location of each TTG in consideration of MS operations. The BS transmits the TTG location information to the MS using a 'Number of OFDMA Symbols' field of a DL-MAP1.

The 802.16e frame includes a DL zone, a TTG, a UL zone, and a Receive Transition Gap (RTG), and the 'Number of OFDMA Symbols' field represents the number of OFDM symbols contained in the DL zone of the 802.16e frame. In this case, the BS decides the location of a TTG (UL or DL zone allocated from the aforementioned frame). If the TTG location is decided, the number of OFDM symbols contained in the DL zone of the 802.16e frame is decided, and the BS transmits information about the number of OFDM symbols contained in the DL zone of the decided 802.16e frame to the MS through the 'Number of OFDMA Symbols' field. In addition, the BS decides the number of OFDM symbols contained in the 802.16e DL zone within a frame, and transmits the decided number of OFDM symbols to the MS through the 'Number of OFDMA Symbols' field, such that the MS can recognize the location including the TTG within a zone allocated for the MS.

In this case, in order to prevent the 802.16m UL zone from overlapping with the 802.16e UL zone, the sum of OFDM symbols contained in the DL zone of the 802.16e frame and the number of TTGs must be equal to or higher than the number of OFDM symbols contained in the 802.16m UL zone.

For example, assuming that the number of TTGs is higher than one OFDM symbol or is less than 2 OFDM symbols, under the condition of 16m:16e=4:4, the number of OFDM symbols contained in the DL zone of the 802.16e frame must be equal to or higher than 23. In this case, the 'Number of OFDMA symbols' field may be fixed to ceil((# of symbols in 16m UL region*length of OFDMA symbol−TTG1)/length of OFDMA symbol) or greater.

Although the 'Number of OFDMA Symbols' field transmitted to the 802.16e MS through the DL-MAP1 is longer than the 802.16e DL zone, the scheduling of the 802.16e MS must be generated only in the 802.16e DL zone. That is, under the condition of "802.16e DL:16m DL=3:5" in FIG. 3, the switching from DL to UL may occur at a fifth subframe, the DL zone of the 802.16e frame includes subframes from a first subframe to a third subframe through a 'DL-MAP-IE( )' field. The scheduling of the 802.16e MS must be carried out only in the 802.16e DL zone.

As shown in FIG. 3, the ratio of the number of subframes allocated to the 802.16m MS to the number of subframes allocated to the 802.16e MS may be 4:4 or 5:3. The BS may fixedly use one of two frames, or may use two frames and may also selectively use one of the two frames.

In addition, the ratio of the number of subframes allocated to the 802.16m MS to the number of subframes allocated to the 802.16e MS may be 6:2 or 7:1. If the aforementioned ratio is 6:2, DL2 and UL6 may be used as the 16m zone in FIG. 3.

Although FIG. 3 shows that the number of subframes per frame at a bandwidth of 5 MHz, 10 MHz, or 20 MHz is set to 8, the concept of FIG. 3 may also be equally applied to other bandwidths of 7 MHz and 8.75 MHz as necessary.

In the aforementioned frame, the IEEE 802.16m F-FDD MS may use the entirety of the 802.16m zone.

In the aforementioned frame, the IEEE 802.16m H-FDD MS may use some of the 802.16m zone in consideration of a transition gap, a superframe header (SFH), and the decoding of preamble. For example, assuming that the ratio of the number of subframes allocated to the 802.16e MS to the number of subframes allocated to the 802.16m MS is 3:5 in FIG. 3, the IEEE 802.16m H-FDD MS is able to use only UL0 and UL1, and is unable to use UL2, UL3 and UL4. In addition, DL7 may not be used because of the transition gap. Otherwise, only some of the DL7 may be used in consideration of the transition gap, etc. during HARQ connection. That is, only UL0, UL1, and 2 DL subframes that are HARQ-connected to the UL0 and the UL1 may be used. In the case where the ratio of the number of subframes allocated to the 802.16e MS to the number of subframes allocated to the 802.16m MS is 4:4, UL3 may not be used because of the transition gap, and DL7 may not be used because of the transition gap.

Figure 4:
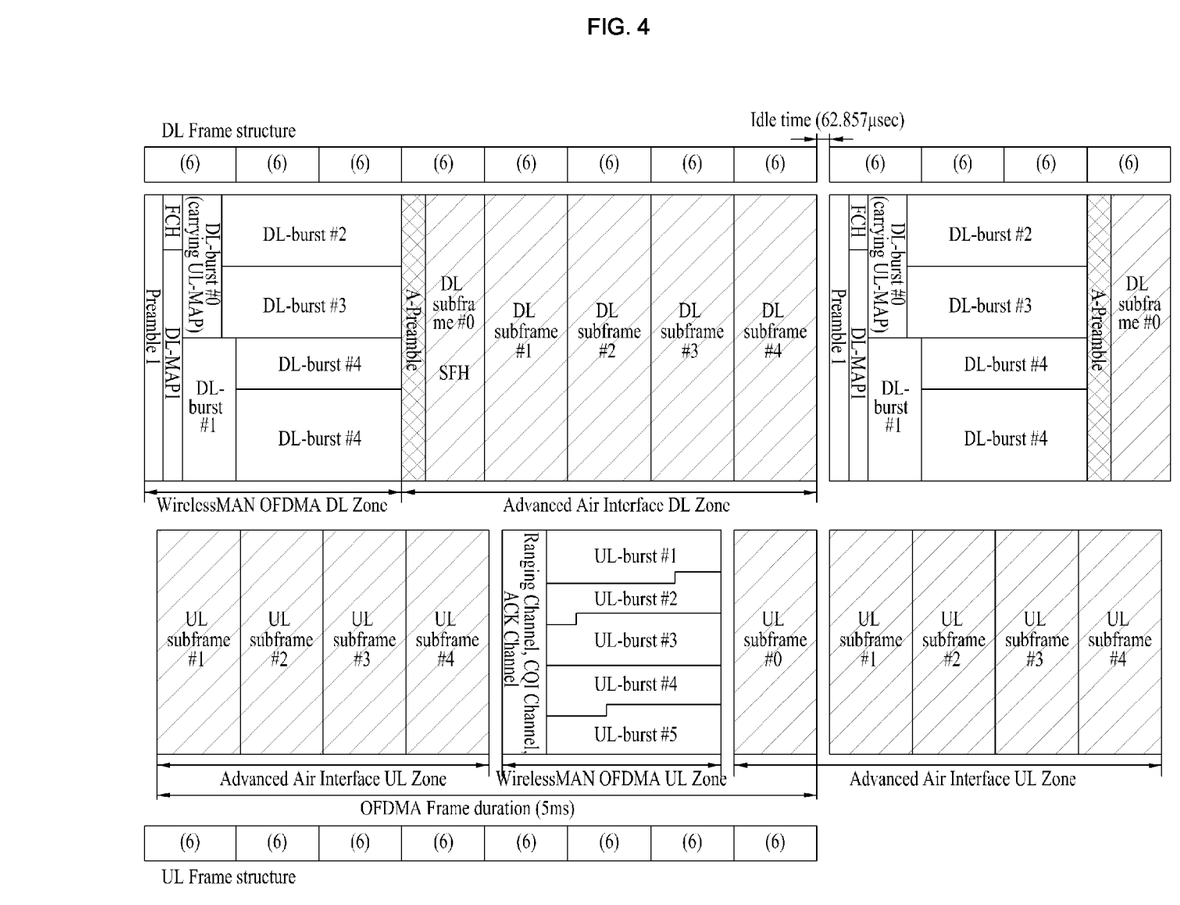
FIG. 4 shows frame structures used when the ratio of the number of subframes allocated to the IEEE 802.16e MS to the number of subframes allocated to the IEEE 802.16m MS is 3:5 according to embodiments of the present invention.

FIG. 4 shows frame structures used when the ratio of the number of subframes allocated to the IEEE 802.16e MS to the number of subframes allocated to the IEEE 802.16m MS is 3:5.

In FIG. 3, based on the case provided just before the IEEE 802.16m DL zone overlaps with the IEEE 802.16m UL zone, the DL zone starting from the rearmost subframe in the time-axis direction of the 802.16e DL zone may be used as the 802.16m zone, and the UL zone starting from the foremost subframe in the time-axis direction of the 802.16e UL zone may be used as the 802.16m zone.

In contrast, when the IEEE 802.16m DL zone overlaps with the IEEE 802.16m UL zone, both the DL zone and the UL zone that start from the rearmost subframe in the time-axis direction of the IEEE 802.16e zone may be allocated to the 802.16m zone. In this case, the 'Number of OFDMA symbols' fields of DL MAP1 and UL MAP1 are decided to satisfy Equation 1, Equation 2, and Equation 3 in such a manner that the 802.16m UL zone and the 802.16m DL zone do not overlap each other.

Number of OFDMA symbols in DL MAP1≥ceil((# of symbols in 16m UL region*length of OFDMA symbol−TTG1)/length of OFDMA symbol)     [Equation 1]

Number of OFDMA symbols in DL MAP1*length of OFDMA symbol+TTG1≥# of symbols in 16m UL region*length of OFDMA symbol     [Equation 2]

Number of OFDMA symbols in DL MAP1*length of OFDMA symbol+TTG1+Number of OFDMA symbols in UL MAP1*length of OFDMA symbol≤(X−# of symbols in second 16m UL region)*length of OFDMA symbol     [Equation 3]

In this case, X is the number of OFDMA symbols contained in one frame. In FIG. 4, a second 802.16m UL zone is denoted by UL #0, and '# of symbols in second 16m UL region' is set to 6. In Equation 3, since "(X−# of symbols in second 16m UL region)*length of OFDMA symbol" indicates the number of symbols located just before the second 802.16m UL zone, it may be replaced with another expression indicating the aforementioned number of symbols. That is, the BS properly adjusts and signals a value of the 'Number of OFDMA symbols' field of the DL MAP1 and a value of the 'Number of OFDMA symbols' field of the UL MAP1 in such a manner that the 802.16m UL zone and the 802.16e UL zone do not overlap each other.

In addition, downlink×subframes and uplink×subframes of the 802.16m zone shown in FIG. 4 may correspond to HARQ connection. That is, DL subframes may be HARQ-connected in a DL zone composed of contiguous subframes in order of time, and UL subframes may be HARQ-connected in a UL zone composed of contiguous subframes in order of time. In this way, HARQ connection for use in the case supporting only the 802.16m FDD MS may also be used for the other case supporting both the 802.16m FDD MS and the 802.16e FDD MS without change. Otherwise, assuming that it is impossible to use HARQ connection when only the 802.16m FDD MS is supported, and a new structure for such HARQ connection is defined, it is preferable that the aforementioned DL and UL subframe structures be used in consideration of a processing time, etc.

Although FIG. 4 shows that the ratio of the number of subframes allocated to the 802.16e MS to the number of subframes allocated to the 802.16m MS is 3:5, the concept of FIG. 4 may also be applied to another case wherein the number of subframes allocated to the 802.16m MS is further increased. In addition, although the number of subframes per frame at 5 MHz, 10 MHz or 20 MHz is 8 as shown in FIG. 4, the concept of FIG. 4 may also be equally applied to another case wherein the number of subframes per frame is not set to 8, for example, one case of 7 MHz (where 5 or 6 subframes are present in one frame) and another case of 8.75 MHz (where 7 subframes are present in one frame).

Next, in the case where data is transmitted and received using a frame structure supporting both a first system MS and a second system MS, a method for transmitting control information by a base station (BS) and a method for receiving control information by a mobile station (MS) according to embodiments of the present invention will hereinafter be described in detail.

The number of subframes allocated to either the 802.16e DL zone or the 802.16e UL zone may be fixed or changed according to conditions. For example, in the case where the 802.16 DL zone includes 5 subframes and the 802.16e UL zone includes 3 subframes as shown in FIG. 2, a BS may allocate all or some of the 5 subframes of the 802.16e DL zone to the 802.16e MS. In the case where only some of the 5 subframes are allocated to the 802.16e MS, subframes not allocated to the 802.16e MS may be allocated to the 802.16m MS. In this case, assuming that UL/DL zones allocated to the 802.16e MS by the BS are represented in the form of symbols, such UL/UL zones may be represented using the number of symbols contained in the subframe to maintain alignment with the subframes as a unit.

If the BS decides the TTG location in the 802.16e frame, a DL zone, a TTG, and a UL zone are decided in the 802.16e frame. Then, the BS transmits information about the number of OFDM symbols contained in the DL zone in the 802.16e frame to the 802.16e MS through the 'Number of OFDMA symbols' field of DL-MAP1. The aforementioned operations are disclosed only for illustrative purposes, and there is no limitation to the method for defining individual zones.

In addition, the BS transmits information about the number of OFDM symbols contained in the UL zone in the 802.16e frame to the 802.16e MS through the 'Number of OFDMA symbols' field of UL-MAP1.

The BS transmits information about the zone allocated to each 802.16e MS to each 802.16e MS using a 'DL-MAP_IE( )' field of a DL-MAP message. In addition, information about TTG1, RTG1, TTG2, and RTG2 is transmitted from the BS to the MS through a DCD message.

First, the exemplary case wherein the BS firstly allocates resources to the 802.16e MS will hereinafter be described in detail.

The BS transmits configuration information of the 802.16e frame as a broadcast- or unicast-signal to the 802.16e MS. The 802.16e MS can recognize the ending location of the DL zone through the received frame configuration information. Therefore, the 802.16e MS performs the switching from DL to UL at the ending point of the DL zone. For example, in FIG. 2, the 802.16e MS performs the switching from DL to UL either at the last subframe (DL4) of the 802.16e DL zone or at a first subframe (UL5) of the UL zone.

The BS may allocate all or some of the 802.16e zone to the 802.16e MS. The BS may inform the 802.16m MS of information about the zone allocated to the 802.16e MS from among the 802.16e zone to the 802.16m MS through either frame configuration information or other format signaling.

As shown in FIG. 2, if 3 subframes (DL0, DL0, DL2) from among 5 DL subframes contained in the 802.16e DL zone are allocated to the 802.16e MS, the 802.16m MS receives information about such allocation information as an input, and may use some parts of the 802.16e DL zone. That is, the 802.16m DL zone includes 5 subframes (DL3, DL4, DL5, DL6, DL7), and the 802.16m UL zone includes the remaining zones (UL0, UL1, UL2, UL3, UL4) other than zones used by the 802.16e MS.

The 802.16m F-FDD MS does not require a transmission gap, such that both the 802.16m DL zone and the 802.16m UL zone can be used. That is, the 802.16m F-FDD MS receives information about subframes being used by the 802.16e MS in the 802.16e zone from the BS, and may transmit a signal using other subframes present in another zone not used by the 802.16e MS. In the aforementioned description, the number of subframes allocated to the 802.16e zone and the number of subframes allocated to the 802.16e MS are disclosed only for illustrative purposes, and the scope or spirit of the present invention is not limited thereto.

The 802.16m H-FDD MS may receive and use some parts of the gap used by the 802.16m F-FDD in consideration of the transition gap. As shown in FIG. 2, in the case where the 802.16e H-FDD MS uses 3 subframes (DL0, DL1, DL2) within the 802.16e DL zone and uses 3 subframes (UL5, UL6, UL7) within the 802.16e UL zone, the 802.16m H-FDD MS may puncture some of the allocated subframes for a DL/UL transition gap or may establish the some subframes as idle subframes and use the established subframes. Subframes allocated for the transition gap may be respectively allocated in DL and UL, or may be allocated in only one of DL and UL. In this case, the ratio of DL and UL supporting the 802.16m H-FDD MS may be changed according to the location of punctured or idle subframes or a subframe via which an SFH is transmitted.

Next, the exemplary case wherein the BS firstly allocates resources to the 802.16m MS will hereinafter be described.

In the case where the BS firstly allocates a zone for the 802.16m FDD MS and then allocates the remaining zone other than the zone to the 802.16e H-FDD MS, the 802.16m FDD MS receives frame configuration information from the BS through the SFH or the ABI, such that the 802.16m FDD MS can recognize not only information about the number and location of subframes allocated to each of DL and UL, but also the number of subframes allocated to the 802.16e MS using the number of allocated subframes. In addition, the 802.16m FDD MS can recognize the location of frame via which the SFH is transmitted using the received frame configuration information.

In FIG. 2, the DL and UL zones allocated to the 802.16m FDD MS overlap each other, such that the DL and UL zones that are capable of being used by the 802.16e H-FDD MS for data transmission are DL0, DL1, DL2, and UL5, UL6, UL7, respectively.

In addition, the 802.16e H-FDD MS transmits data using a Group 1 (i.e., DL subframe 1) of the conventional 802.16e H-FDD structure. In order to support the 802.16e H-FDD MS, the number of symbols allocated to the DL subframe 1 must be equal to or higher than 12 symbols (7 MHz) or 16 symbols (5 MHz, 8.75 MHz, 10 MHz).

In the case where the DL and UL zones of the 802.16m FDD MS overlap each other as shown in FIG. 2, the length of remaining areas must be higher than 12 or 16 symbols to support the 802.16e H-FDD MS, such that it is necessary for the 802.16e H-FDD MS to receive a minimum of two or three DL subframes according to bands.

The length of the DL subframe 1 may be extended to a symbol corresponding to the ending point of the 802.16m UL zone. Needless to say, although the length of the DL subframe 1 may also be extended to the symbol or more, the length of the UL zone is reduced.

Therefore, the 802.16e H-FDD MS schedules the remaining zone other than zones allocated to the 802.16m FDD, transmits data using the scheduled zone, and performs the switching from DL to UL within the last UL subframe allocated to the 802.16m FDD MS. For example, in the case where 5 subframes are allocated to UL and DL zones of the 802.16m F-FDD MS as shown in FIG. 2, the UL and DL zones that are capable of being scheduled and used by the 802.16e H-FDD MS are respectively identical to DL0, DL1 and DL2 subframes and UL5, UL6, and UL7 subframes. Therefore, the 802.16e H-FDD MS may perform the DL/UL switching using TTG and RTG received through DCD at a specific point corresponding to either the last symbol of the DL4 subframe or the first symbol of the UL5 subframe. Needless to say, although the switching may occur at an arbitrary point, the scheduled area must be limited to the 802.16e zone (DL0, DL1, DL2, UL5, UL6, UL7) not allocated to the 802.16m MS.

The BS must transmit information about the area scheduled by the 802.16e H-FDD MS and information about the DL/UL switching point to the 802.16e MS. The 802.16e H-FDD MS can recognize information about the DL/UL switching point as the number of symbols allocated to the DL subframe 1. In this case, information about the length of the DL subframe 1 allocated to the 802.16e H-FDD MS is transmitted through the 'Number of OFDMA Symbols' field of the DL-MAP1 of the current frame. The 802.16e H-FDD MS transmits data by scheduling only the remaining areas other than subframes allocated for the 802.16m F-FDD MS within a given DL subframe 1 zone.

In addition, the BS transmits the 'Number of OFDMA Symbols' field of the UL-MAP1 to the 802.16e H-FDD MS, such that it may indicate the size of a DL zone of a frame allocated to the 802.16e H-FDD MS within the UL zone.

The BS transmits information about the area scheduled for the 802.16e MS to the 802.16e H-FDD MS using the 'DL-MAP_IE( )' field of the DL-MAP message. In addition, the BS transmits information about TTG1, RTG1, TTG2, and RTG2 requisite for the DL/UL switching of the 802.16e H-FDD MS to the MS through the DCD message.

The 802.16m H-FDD MS transmits data using information of subframe configuration allocated to the 802.16m F-FDD MS. Therefore, in order to adjust frame alignment with the F-FDD MS, the 802.16m H-FDD MS may puncture subframes to generate a gap requisite for the DL/UL switching, or may establish subframes requisite for the DL/UL transition gap as idle subframes and not schedule such subframes. For example, as shown in FIG. 2, the 802.16m H-FDD MS, from among DL subframes allocated to and used by the 802.16m F-FDD MS, may puncture the last DL subframe (DL 4) for the transition gap or may establish the last DL subframe (DL 4) as an idle subframe or not schedule the last subframe to the MS.

In addition, in the UL zone, in order to receive an A-preamble and an SFH transmitted via downlink, a subframe that is located at the same position as in a subframe via which such signals are transmitted, and the next subframe may be punctured or be established as idle subframes. In addition, in order to establish the transition gap, the same method as in the method for forming the transition gap may be applied to the UL2 subframe. Therefore, the 802.16m H-FDD MS can transmit data using UL0 and UL1 subframes in the UL zone. The aforementioned frame structure is disclosed only for illustrative purposes, and the embodiments of the present invention can support the 802.16m H-FDD MS using various types of frame structures according to the punctured or idle subframes for the transition gap.

Figure 5:
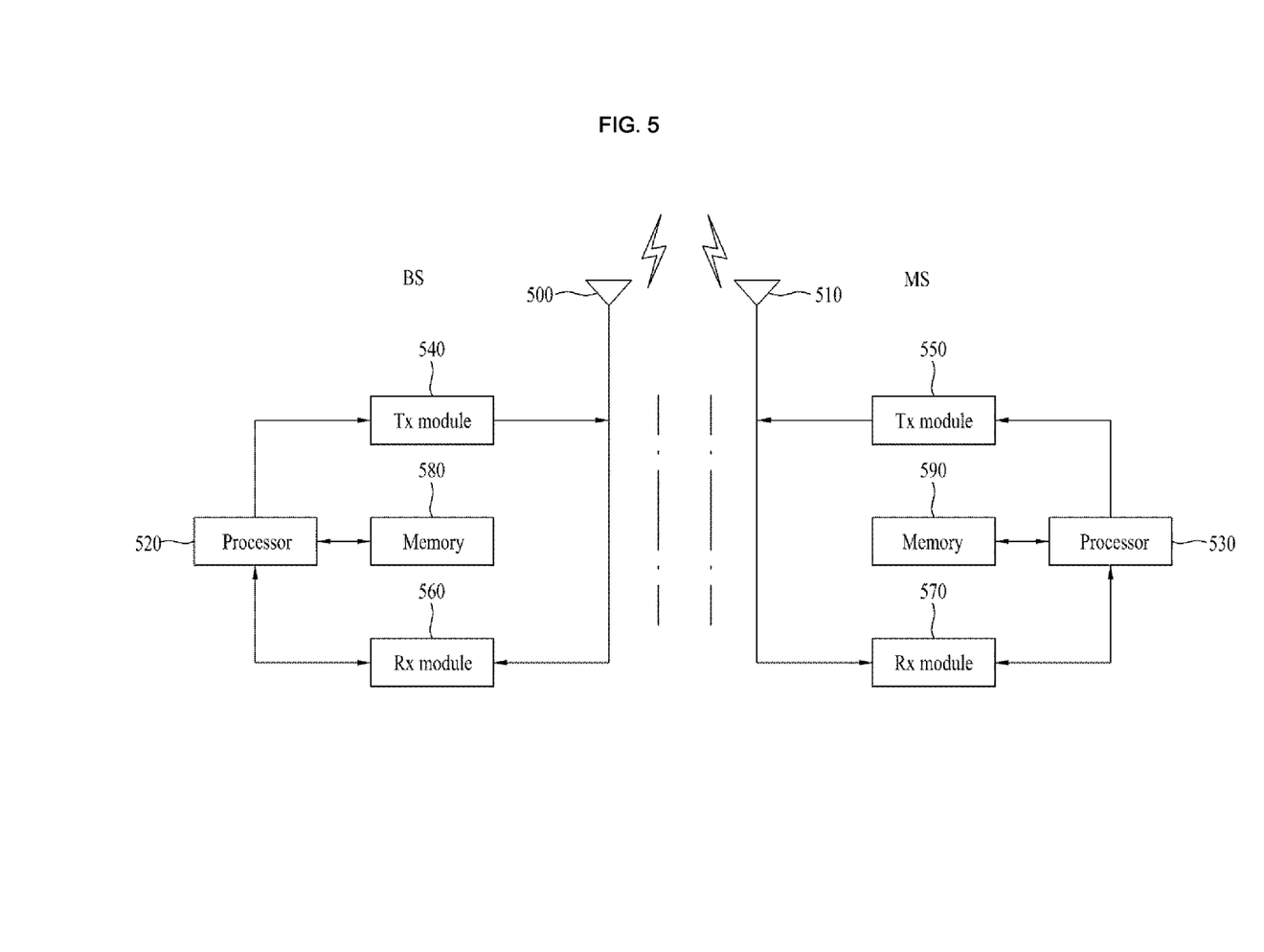
FIG. 5 is a block diagram illustrating an advanced mobile station (AMS) and an advanced base station (ABS) for use in embodiments of the present invention.

FIG. 5 is a block diagram illustrating detailed constituent components of an advanced mobile station (AMS) and an advanced base station (ABS) that can be implemented through the above-mentioned embodiments.

Referring to FIG. 5, each of the AMS and the ABS may include an antenna 500 or 510 for transmitting and receiving information, data, signals and/or messages, a Transmission (Tx) module 540 or 550 for transmitting messages by controlling the antenna 500 or 510, a Reception (Rx) module 560 or 570 for receiving messages by controlling the antenna 500 or 510, a memory 580 or 590 for storing information related to ABS communication, and a processor 520 or 530 for controlling the memory 580 or 590. In this case, the ABS may be a femto BS (FBS) or a macrocell BS (MBS). The components of the AMS are the counter parts of those of the ABS.

The antennas 500 and 510 include Tx antennas for transmitting signals generated from Tx modules 540 and 550 and Rx antennas for receiving radio frequency (RF) signals and providing the received RF signals to the Rx modules 560 and 570. If a Multiple Input Multiple Output (MIMO) function is supported, two or more antennas may be provided.

The processors 520 and 530 generally provide overall control to the AMS and the ABS, respectively. Especially, the processors 520 and 530 may perform a control function for implementing the above-described exemplary embodiments of the present invention, a variable MAC frame control function based on service characteristics and a propagation environment, a handover function, an authentication and encryption function, etc. In addition, each of the processors 520 and 530 may include an encryption module for controlling encryption of various messages and a timer module for controlling transmission and reception of various messages.

The transmission (Tx) modules 540 and 550 may encode and modulate transmission data scheduled by the processors 520 and 530 according to a predetermined coding and modulation scheme and provide the modulated data to the antennas 500 and 510.

The reception (Rx) modules 560 and 570 may recover original data by demodulating and decoding data received through the antennas 500 and 510 and provide the recovered data to the processors 520 and 530.

The memories 580 and 590 may store programs for processing and control of the processors 520 and 530 and temporarily store input/output data (on the side of the AMS, an uplink grant received from the ABS, system information, a station identifier (STID), a flow identifier (FID), an action time, and the like).

Each of the memories 580 and 590 may include at least one type of storage media such as a flash memory, a hard disk, a multimedia card micro, a card-type memory (e.g. a Secure Digital (SD) or eXtreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory, a magnetic memory, a magnetic disc, an optical disc, etc.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other.

Accordingly, the invention should not be limited to the specific embodiments described herein, but should be accorded the broadest scope consistent with the principles and novel features disclosed herein.

Various embodiments have been described in the best mode for carrying out the invention.

The exemplary embodiments of the present invention are applicable to various wireless access systems. The exemplary embodiments of the present invention have the following effects. The embodiments of the present invention can support both the IEEE 802.16e MS and the IEEE 802.16m MS, and can indicate a switching point of the IEEE 802.16e MS.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of the claims, and all modifications within the equivalent range of the present invention are contained in the scope of the present invention.

Exemplary embodiments of the present invention have the following effects. The embodiments of the present invention can support both the IEEE 802.16e MS and the IEEE 802.16m MS, and can indicate a switching point of the IEEE 802.16e MS.

It will be appreciated by persons skilled in the art that that the effects that can be achieved with the present invention are not limited to what has been particularly described hereinabove and other advantages of the present invention will be more clearly understood from the following detailed description taken in conjunction with the accompanying drawings.

What is claimed is:

1. A method for transmitting control information in a process of data transmission and reception in a frequency division duplex (FDD) scheme, the method carried out by a base station of a wireless communication system supporting a mobile station of a half-FDD (H-FDD) system and a mobile station of an FDD system, the method comprising:

transmitting, to the mobile station of the H-FDD system, information about a number of orthogonal frequency division multiplexing (OFDM) symbols contained in an H-FDD downlink zone in an FDD frame through a 'Number of orthogonal frequency division multiple access (OFDMA) symbols' field of a downlink mobile application part (DL-MAP); and transmitting, to the mobile station of the H-FDD system, information about a number of OFDM symbols contained in an H-FDD uplink zone in the FDD frame through a 'Number of OFDMA symbols' field of an uplink MAP (UL-MAP), wherein ratio of a number of subframes allocated to the mobile station of the FDD system to a number of subframes allocated to the mobile station of the H-FDD system is 5:3, wherein if an FDD downlink zone and an FDD uplink zone are overlapped in the FDD frame, the information transmitted through the 'Number of OFDMA symbols' field of the DL-MAP and the information transmitted through the 'Number of OFDMA symbols' field of the UL-MAP are configured by using Equation A so that the H-FDD uplink zone and the FDD uplink zone do not overlap each other, wherein Equation A is defined as follows:

Number of OFDMA symbols in DL MAP×length of OFDMA symbol+TTG+Number of OFDMA symbols in UL MAP×length of OFDMA symbols≤(X−Number of symbols in a zone in which the FDD downlink zone and the FDD uplink zone are overlapped)×length of OFDMA symbol, wherein TTG is a Transmit Transition Gap for switching from downlink to uplink in an H-FDD zone, and X is a number of OFDMA symbols contained in one frame.

2. The method according to claim 1, wherein the FDD downlink zone is allocated after the H-FDD downlink zone in downlink bandwidth and the FDD uplink zone is allocated before the H-FDD zone in uplink bandwidth.

3. The method according to claim 2, wherein sum of the H-FDD downlink zone and the FDD downlink zone is a length of the FDD frame.

4. The method according to claim 2, wherein a sum of the H-FDD uplink zone and the FDD uplink zone is a length of the FDD frame.

5. A method for receiving control information in a process of data transmission and reception in a frequency division duplex (FDD) scheme, the method carried out by a mobile station of a half-FDD (H-FDD) system, the method comprising:

receiving information about a number of orthogonal frequency division multiplexing (OFDM) symbols contained in an H-FDD downlink zone in an FDD frame from a base station through a 'Number of orthogonal frequency division multiple access (OFDMA) symbols' field of a downlink mobile application part (DL-MAP); and receiving information about a number of OFDM symbols contained in an H-FDD uplink zone in the FDD frame from the base station through a 'Number of OFDMA symbols' field of an uplink MAP (UL-MAP), wherein ratio of a number of subframes allocated to the mobile station of the FDD system to a number of subframes allocated to the mobile station of the H-FDD system is 5:3, wherein if an FDD downlink zone and a FDD uplink zone are overlapped in the FDD frame, the information transmitted through the 'Number of OFDMA symbols' field of the DL-MAP and the information transmitted through the 'Number of OFDMA symbols' field of the UL-MAP are configured by using Equation A so that the H-FDD uplink zone and the FDD unlink zone do not overlap each other:

wherein Equation A is defined as follows:

Number of OFDMA symbols in DL MAP×length of OFDMA symbol+TTG+Number of OFDMA symbols in UL MAP×length of OFDMA symbols≤(X−Number of symbols in a zone in which the FDD downlink zone and the FDD uplink zone are overlapped)*length of OFDMA symbol, wherein TTG is a Transmit Transition Gap for switching from downlink to uplink in an H-FDD zone, and X is a number of OFDMA symbols contained in one frame.

6. The method according to claim 5, wherein the FDD downlink zone is allocated after the H-FDD downlink zone in downlink bandwidth and the FDD uplink zone is allocated before the H-FDD uplink zone in uplink bandwidth.

7. The method according to claim 6, wherein a sum of the H-FDD downlink zone and the FDD downlink zone is a length of the FDD frame.

8. The method according to claim 6, wherein a sum of the H-FDD uplink zone and the FDD uplink zone is a length of the FDD frame.

9. A base station in a wireless communication system supporting a mobile station of a half frequency division duplex (H-FDD) system and a mobile station of an FDD system, the base station comprising:

a radio frequency (RF) module; and a processor configured to control the RF module, wherein the processor is configured to transmit, to the mobile station of the H-FDD system, information about a number of orthogonal frequency division multiplexing (OFDM) symbols contained in an H-FDD downlink zone in an FDD frame through a 'Number of orthogonal frequency division multiple access (OFDMA) symbols' field of a downlink mobile application part (DL-MAP), and to transmit, to the mobile station of the H-FDD system, information about a number of OFDM symbols contained in an H-FDD uplink zone in the FDD frame through a 'Number of OFDMA symbols' field of an uplink MAP (UL-MAP), wherein ratio of a number of subframes allocated to the mobile station of the FDD system to a number of subframes allocated to the mobile station of the H-FDD system is 5:3, wherein if an FDD downlink zone and an FDD uplink zone are overlapped in the FDD frame, the information transmitted through the 'Number of OFDMA symbols' field of the DL-MAP and the information transmitted through the 'Number of OFDMA symbols' field of the UL-MAP are configured by using Equation A so that the H-FDD uplink zone and the FDD uplink zone are not overlapped each other:

wherein Equation A is defined as follows:

Number of OFDMA symbols in DL MAP×length of OFDMA symbol+TTG+Number of OFDMA symbols in UL MAP×length of OFDMA symbol≤(X−Number of symbols in a zone in which the FDD downlink zone and the FDD uplink zone are overlapped)*length of OFDMA symbol, and wherein TTG is a Transmit Transition Gap for switching from downlink to uplink in an H-FDD zone, and X is a number of OFDMA symbols contained in one frame.

10. The base station according to claim 9, wherein the FDD downlink zone is allocated after the H-FDD downlink zone in downlink bandwidth and the FDD uplink zone is allocated before the H-FDD uplink zone in uplink bandwidth.

11. The base station according to claim 10, wherein sum of the H-FDD downlink zone and the FDD downlink zone is a length of the FDD frame.

12. The base station according to claim 10, wherein a sum of the H-FDD uplink zone and the FDD uplink zone is a length of FDD frame.

13. A mobile station comprising:

a radio frequency (RF) module; and a processor configured to control the RF module, wherein the processor is configured to receive information about a number of orthogonal frequency division multiplexing (OFDM) symbols contained in H-FDD downlink zone in an FDD frame from a base station through a 'Number of OFDMA symbols' field of a downlink mobile application part (DL-MAP), and to receive information about a number of OFDM symbols contained in an H-FDD uplink zone in the FDD frame from the base station through a 'Number of orthogonal frequency division multiple access (OFDMA) symbols' field of an uplink MAP (UL-MAP), wherein ratio of a number of subframes allocated to the mobile station of the FDD system to a number of subframes allocated to the mobile station of the H-FDD system is 5:3, wherein if an FDD downlink zone and an FDD uplink zone are overlapped in the FDD frame, the information transmitted through the 'Number of OFDMA symbols' field of the DL-MAP and the information transmitted through the 'Number of OFDMA symbols' field of the UL-MAP are configured by using Equation A so that the H-FDD uplink zone and the FDD uplink zone do not overlap each other:

wherein Equation A is defined as follows:

Number of OFDMA symbols in DL MAP×length of OFDMA symbol+TTG+Number of OFDMA symbols in UL MAP×length of OFDMA symbol≤(X−Number of symbols in a zone in which the FDD downlink zone and the FDD uplink zone are overlapped)*length of OFDMA symbol, and wherein TTG is a Transmit Transition Gap for switching from downlink to uplink in an H-FDD zone, and X is a number of OFDMA symbols contained in one frame.

14. The mobile station according to claim 13, wherein the FDD downlink zone is allocated after the H-FDD downlink zone in downlink bandwidth and the FDD uplink zone is allocated before H-FDD uplink zone in uplink bandwidth.

15. The mobile station according to claim 14, wherein a sum of the H-FDD downlink zone and the FDD downlink zone is a length of the FDD frame.

16. The mobile station according to claim 14, wherein a sum of the H-FDD uplink zone and the FDD uplink zone is a length of the FDD frame.

* * * * *